United States Patent
Eckstein et al.

(10) Patent No.: US 9,810,254 B2
(45) Date of Patent: Nov. 7, 2017

(54) EXPANSION BOLT

(71) Applicant: Hilti Aktiengesellschaft, Schaan (LI)

(72) Inventors: Andreas Eckstein, Landsberg am Lech (DE); Mathias Goldt, Feldkirch (AT); Marc Schaeffer, Feldkirch-Nofels (AT); Arjen Detmer Dijkhuis, Feldkirch (AT); Joerg Appl, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 39 days.

(21) Appl. No.: 14/412,391

(22) PCT Filed: Jun. 25, 2013

(86) PCT No.: PCT/EP2013/063192
§ 371 (c)(1),
(2) Date: Dec. 31, 2014

(87) PCT Pub. No.: WO2014/005876
PCT Pub. Date: Jan. 9, 2014

(65) Prior Publication Data
US 2015/0135511 A1 May 21, 2015

(30) Foreign Application Priority Data
Jul. 2, 2012 (DE) .......................... 10 2012 211 418

(51) Int. Cl.
*F16B 13/06* (2006.01)
*F16B 31/02* (2006.01)

(52) U.S. Cl.
CPC .......... *F16B 31/027* (2013.01); *F16B 13/065* (2013.01); *F16B 31/028* (2013.01); *Y10T 29/4994* (2015.01)

(58) Field of Classification Search
CPC ........ F16B 13/04; F16B 13/045; F16B 13/06; F16B 13/063; F16B 13/0858; F16B 13/0875; F16B 39/26; F16B 39/24; F16B 31/028; F16B 31/027; F16B 13/065; Y10T 29/4994
See application file for complete search history.

(56) References Cited

U.S. PATENT DOCUMENTS

| 1,583,849 A | 5/1926 | Minett |
| 2,850,937 A | 9/1958 | Ralston |

(Continued)

FOREIGN PATENT DOCUMENTS

| DE | 7 334 026 | 1/1974 |
| DE | 2939096 | 4/1981 |

(Continued)

*Primary Examiner* — Jun Yoo
(74) *Attorney, Agent, or Firm* — Davidson, Davidson & Kappel, LLC

(57) ABSTRACT

An expansion bolt including an anchor bolt having an expansion section, and further including an expansion sleeve which surrounds the anchor bolt and which can be expanded by retracting the expansion section, and a spring element arranged on the anchor bolt. The spring element can be tensioned by inserting the anchor bolt into a bore hole and can retract the expansion section of the anchor bolt into the expansion sleeve when it is released. An indicator element indicates when a rated tension of the spring element is reached.

9 Claims, 1 Drawing Sheet

(56) References Cited

U.S. PATENT DOCUMENTS

| | | | | |
|---|---|---|---|---|
| 3,439,576 | A | * | 4/1969 | Lerich ................. F16B 13/065 411/67 |
| 3,861,636 | A | * | 1/1975 | Diener ................ F16B 13/065 248/343 |
| 4,138,922 | A | * | 2/1979 | Richter ................ F16B 31/028 411/14 |
| 5,085,546 | A | | 2/1992 | Fischer |
| 5,240,361 | A | | 8/1993 | Armstrong et al. |
| 5,586,851 | A | | 12/1996 | Haage et al. |
| 6,722,711 | B2 | | 4/2004 | Kitzis et al. |
| 8,002,641 | B2 | * | 8/2011 | Wallace ................ F16B 31/028 470/41 |
| 2004/0163229 | A1 | * | 8/2004 | Janusz .................. B25B 31/00 29/456 |
| 2008/0050195 | A1 | | 2/2008 | Wieser et al. |
| 2011/0081217 | A1 | | 4/2011 | Wissling et al. |

FOREIGN PATENT DOCUMENTS

| | | |
|---|---|---|
| DE | 3142432 | 10/1981 |
| DE | 30 22 011 | 12/1981 |
| DE | 3146702 | 7/1983 |
| DE | 3331097 | 3/1985 |
| DE | 101 06 844 | 9/2002 |
| EP | 0 461 790 | 12/1991 |
| EP | 0688965 | 12/1998 |
| EP | 1 892 424 | 2/2008 |
| GB | 1583849 | 2/1981 |
| JP | S54148956 | 11/1979 |
| JP | H0814232 | 1/1996 |
| JP | 2000230530 | 4/2000 |
| JP | 2001187911 | 7/2001 |
| JP | 2002122120 | 4/2002 |
| JP | 2003106318 | 4/2003 |
| TW | 201113444 | 4/2011 |
| WO | WO 97 32631 | 9/1997 |

* cited by examiner

EXPANSION BOLT

The present invention relates to an expansion anchor.

BACKGROUND

Expansion anchors are known, for example, from EP 1 892 424 A2, which include an anchor bolt and an expansion sleeve. They are used to secure a component to a substrate. For anchoring the expansion anchor in the substrate, the expansion sleeve is inserted, in particular, hammered, into a prepared bore with the aid of the anchor bolt. The anchor bolt is then withdrawn a certain extent from the bore, the expansion sleeve in this case remaining essentially fixed in place due to its interaction with the surrounding bore hole wall. Consequently, an axial displacement of the anchor bolt occurs relative to the expansion sleeve, and the expansion section of the anchor bolt is refracted axially into the expansion sleeve. As a result of the retraction, the expansion sleeve in turn is radially expanded and the anchor is thereby anchored in the bore hole. This principle also forms the basis of the present invention.

The extraction of the anchor bolt in order to expand the expansion sleeve may be accomplished according to EP 1 892 424 A2, for example, by tightening a nut situated on the anchor bolt. For a particularly consistent and reliable result, a defined torque should be applied in this case to the nut, for example, with the aid of a torque wrench, in order on the one hand to ensure a sufficient expansion of the expansion sleeve and, on the other hand, to prevent potentially adverse excess stress on the expansion mechanism.

Another expansion anchor is known from DE 101 06 844 A1. In this expansion anchor, the extraction of the anchor bolt in order to expand the expansion sleeve is accomplished by a spring element. The known expansion anchor is inserted with the pre-stressed spring element into the bore hole. A holding mechanism is subsequently detached and the spring element is released.

A generic expansion anchor emanates from WO 97/32631 A1. This publication describes an expansion anchor for sport climbing having a spring element, which is tensioned in the bore hole when the anchor is inserted, and which then activates the expansion mechanism.

DE 33 31 097 C2, U.S. Pat. No. 1,583,849 A and DE 30 22 011 A1 describe expansion anchors having spring elements, which are able to maintain the pretensioning in the anchor, even if structural changes in the substrate should occur after the setting operation. Additional expansion anchors having spring elements are known from EP 0 461 790 B1 and DE 7 334 026 U.

SUMMARY OF THE INVENTION

It is an object of the present invention to provide an expansion anchor which may be particularly simply, but also reliably, set with particularly minimum effort and low costs.

The present invention provides an expansion anchor, which includes an anchor bolt having an expansion section, an expansion sleeve, which surrounds the anchor bolt, and which may be expanded by retracting the expansion section, and a spring element situated on the anchor bolt, which may be tensioned by inserting the anchor bolt into a bore hole, and which is able to retract the expansion section of the anchor bolt into the expansion sleeve when it is released, is provided with an indicator element, which indicates when a setpoint tension of the spring element is reached.

A first fundamental idea of the present invention may be seen as that of fitting the expansion anchor with a spring element, which is compressed when the anchor is driven into the bore hole, and absorbs energy in the process, this absorbed energy activating the expansion mechanism of the expansion anchor during the subsequent release of the spring element and securing the anchor in the bore hole. Accordingly, both the driving in of the anchor as well as the activation of the expansion mechanism may be effected according to the present invention by axial forces alone. For setting the anchor, therefore, only one single tool, for example, a hammer is required, whereas a wrench may be dispensed with. In this way, the setting operation is simplified significantly, as compared to a torque-controlled setting operation with the aid of a nut.

Based on this, the present invention also found that by monitoring the spring element according to the present invention, it is possible to verify in a particularly simple as well as reliable manner whether the expansion mechanism was correctly activated, [and] thus, whether the anchor was properly set. The core of the expansion mechanism, namely the expansion section and the expansion sleeve, is in fact at least partially hidden in the bore hole once the anchor is set, and is therefore no longer readily accessible for an immediate setting check. However, the present invention found on the one hand that the spring element according to the present invention provides an additional component, which is involved in the setting operation and, therefore, allows for conclusions to be drawn about the setting operation, and, on the other hand, also found that during setting, the spring element may remain at least partially outside the bore hole, so that it is particularly easily accessible for a setting check. Based on this finding, the present invention describes an indicator element, which monitors the spring element and which, in particular, indicates whether a setpoint tension in the spring element has been reached. Since, according to the present invention, the expansion mechanism is activated at least partially by the energy stored in the spring element, the maximum tension in the spring element is a particularly reliable indicator as to what degree the expansion mechanism has been activated. Since the spring tension is in general also directly related to the spring deflection, the setting may be checked in a particularly simple manner by monitoring the deformation of the spring element. An indicator element according to the present invention associated with the spring element thus makes a particularly reliable setting check possible using particularly simple means.

According to the present invention, an indicator element is provided, which indicates when a setpoint tension of the spring element is reached. Since in general the spring tension is directly related to the spring deflection, an indicator element in an alternative description may be provided, which indicates when the setpoint spring deflection is reached.

Preferably, the indicator element is an integral part of the expansion anchor. Thus, each anchor has its own indicator element, which makes handling significantly easier. In particular, it may therefore be provided that the indicator element is mechanically connected to the anchor bolt.

It is particularly preferred that the indicator element is situated on the spring element. This may allow for a structurally particularly simple and compact design together with high reliability.

It is also advantageous that the spring element includes at least one disk spring. Disk springs may have spring characteristics which are particularly suited for reliably activating the expansion mechanism made up of expansion section and expansion sleeve. Moreover, it may be particularly easily verified when the setpoint tension on disk springs is reached.

For example, it may be provided that the indicator element includes an indicator ring, which is connected to the disk spring, and which detaches at least partially from the disk spring when the setpoint tension is reached. For example, the indicator ring may be glued to the disk spring. Tensing the disk spring results in a deformation of the disk spring and, thus, to a stressing of the connection between indicator ring and disk spring. When the setpoint tension is reached, the integral connection between indicator ring and spring disk is loosened, and the indicator ring is at least partially released, which indicates a correct setting operation. However, the indicator element may also be activated as a result of an element connected to the anchor bolt, for example, a nut, striking the indicator element when the setpoint spring deflection is reached, as a result of which, for example, a part of the indicator element may be separated or a color cartridge may be destroyed. Thus, the indicator element may be activated according to the present invention through deformation of the spring element or through impact of an element connected to the anchor bolt, in particular, the nut situated on the anchor bolt.

It is particularly advantageous that the disk spring and/or the indicator ring surround(s) the anchor bolt. A particularly compact design may be obtained in this way.

In particular, the disk spring may be configured in such a way that it is completely flat when the setpoint tension is reached. In this way, it may be particularly easy to verify when the setpoint tension is reached.

In order to be able to tension the spring element by inserting the anchor bolt into the bore hole, and for the spring element to be able to retract the expansion section of the anchor bolt into the expansion sleeve when it is subsequently released, the anchor bolt includes, according to the present invention, a support for the spring element. The spring element is advantageously provided on the side facing away from the support for contacting a component to be fastened or for directly contacting the mouth of the bore hole, so that the spring element may be braced between the support of the anchor bolt and the component or the mouth of the bore hole.

The support is preferably formed by the nut situated on the anchor bolt. Accordingly, the nut for tensioning the spring element situated on the anchor bolt acts on the spring element. Preferably, the same nut may also activate the indicator element. In principle, however, other elements may also serve as a support. Additional elements such as, for example, washers may also be provided between the support and the spring element.

The present invention is particularly suited for expansion anchors, which are designed as so-called stud anchors. In stud anchors, the expansion sleeve is relatively short and does not reach beyond the bore hole after the intended setting operation. The axial fixing of the expansion sleeve in the bore hole necessary for expanding the expansion sleeve is generally effected in stud anchors primarily by the interaction, in particular the friction, between the bore hole wall and the sleeve. Since in the case of such stud anchors the expansion sleeve is generally situated completely inside the bore hole after setting, it is particularly difficult, even with this type of anchor, to check a setting of the expansion sleeve itself. The setting check according to the present invention with the aid of an indicator element on the external spring element creates the possibility nevertheless of carrying out a simple setting check.

Stud anchors are generally distinguished by the fact that a stop is provided, in particular molded, on the anchor bolt, in particular, on the side of the expansion sleeve facing away from the expansion section, which limits a displacement of the expansion sleeve beyond the expansion section. Namely, this allows the relatively short expansion sleeve, together with the anchor bolt, to be inserted deeply into the bore hole. This feature may also be advantageously provided in an anchor according to the present invention. The stop is advantageously annular in design and may be formed, for example, by an annular step or an annular ridge.

It is also preferred that the spring element has a degressive spring characteristic. In the case of a degressive spring characteristic, namely, a high force may be maintained over a wide spring deflection, and thus it may be ensured that the expansion mechanism is reliably activated, even when the expansion sleeve slips back a certain extent toward the bore hole during setting. In particular against this background, it may also be advantageous that the spring element includes at least one disk spring, since with a disk spring a degressive spring characteristic may be provided in a particularly simple manner.

The anchor bolt may preferably include a load application means, for example, a thread, but also a head, which serves to introduce axial tensile forces into the anchor bolt. The load application means may be advantageously situated on an end section of the anchor bolt opposite the expansion section. The introduction of axial impact forces into the anchor bolt for setting the anchor, in particular for driving the anchor bolt with the expansion sleeve into the bore hole and/or for tensioning the spring device, may take place preferably at the front face of the anchor bolt, for example, via hammer blows to the front face of the anchor bolt.

The anchor bolt tapers in the expansion section advantageously in the direction of the expansion sleeve or the load application means. In the expansion section, the anchor bolt may be, in particular, conical. In order for the expansion section to be able to deform the expansion sleeve, the anchor bolt has an outer cross section, which is larger than the inner cross section of the non-deformed expansion sleeve.

Insofar as "axial" and "radial" are mentioned in connection with this application, this may relate in the usual technical sense, in particular, to the longitudinal axis of the anchor bolt.

The present invention also relates to an arrangement made up of a substrate, in particular, a concrete substrate, in which a bore hole is formed, and to an expansion anchor according to the present invention which is accommodated in the bore hole. The expansion sleeve in this arrangement advantageously secures the expansion anchor in the bore hole.

The present invention further relates to a method for setting an expansion anchor according to the present invention, in which a bore hole is provided in a substrate, the expansion sleeve of the expansion anchor is driven into the bore hole by applying axial forces to the anchor bolt, the spring element of the expansion anchor is tensioned to a setpoint tension by applying axial forces to the anchor bolt, the indicator element indicating when the setpoint tension is reached, the expansion section of the anchor bolt being retracted into the expansion sleeve by energy stored in the spring element, so that the expansion sleeve expands radially and anchors the expansion anchor in the bore hole.

BRIEF DESCRIPTION OF THE DRAWING

The present invention is explained in greater detail below with reference to preferred exemplary embodiments, which are schematically depicted in the appended figures.

DETAILED DESCTIPTION

Figure 1:
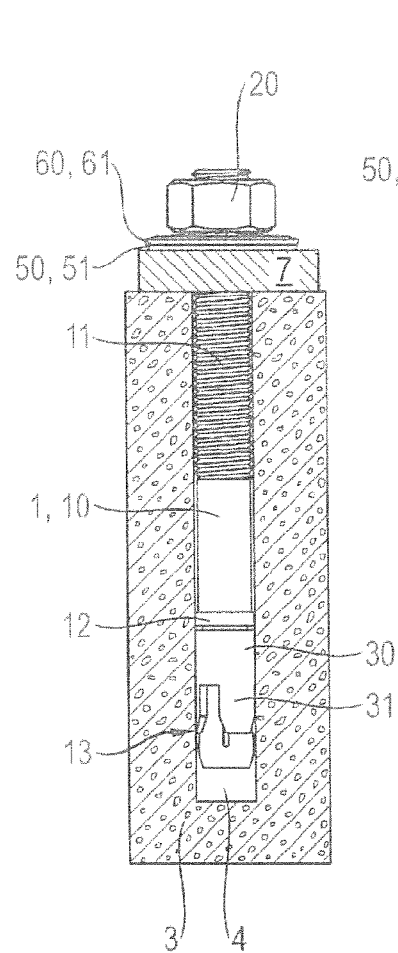
FIGS. 1 through 3 schematically show a specific embodiment of an expansion anchor according to the present invention at consecutive points in time during the setting operation.
Figure 2:
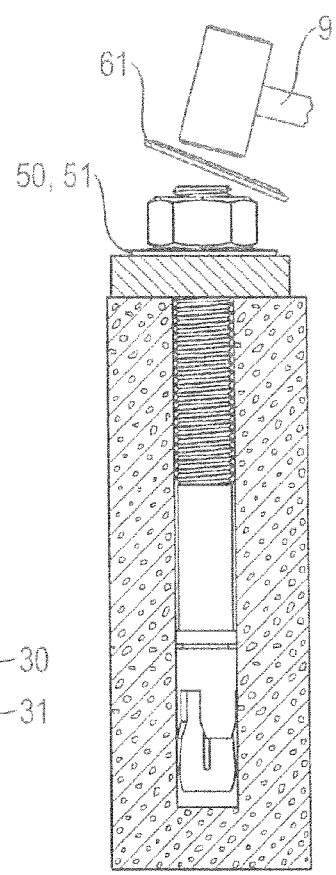
Figure 3:
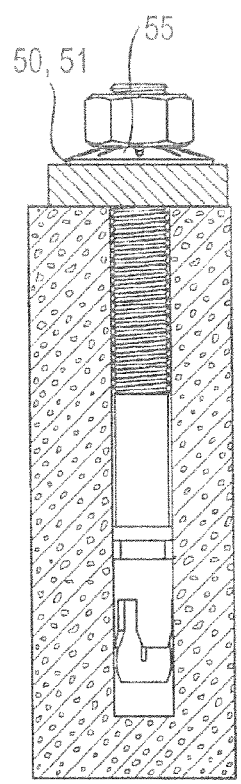

FIGS. 1 through 3 depict an exemplary embodiment of an expansion anchor 1 according to the present invention. Expansion anchor 1 includes a long anchor bolt 10, on the outer surface of which a load application means 11 implemented as an external thread 11 is situated. A corresponding nut 20 is screwed onto this thread 11 of anchor bolt 10.

Expansion anchor 1 also includes an expansion sleeve 30, which surrounds anchor bolt 10 in a ring-like fashion. The side of expansion sleeve 30 facing away from thread 11 is provided with multiple expansion flaps 31 separated by slits, expansion flaps 31 being splayable radially outwardly for anchoring expansion anchor 1.

Anchor bolt 10 includes an expansion section 13 at its end section opposite thread 11. In the expansion section 13, the cross section of the anchor bolt 10 increases, for example, conically, with increasing distance from expansion sleeve 30, so that expansion section 13 is able to radially expand expansion sleeve 30, in particular, expansion flaps 31 thereof, when it is retracted in the axial direction into expansion sleeve 30.

On the side of expansion sleeve 30 facing away from expansion section 13, anchor bolt 10 includes on its outer surface a stop 12 for expansion sleeve 30 designed, for example, as an annular step. This stop 12 limits an axial movement of expansion sleeve 30 toward the load application means of anchor bolt 10, i.e., for example, toward thread 11.

Expansion anchor 1 also includes a spring element 50 having a disk spring 51, anchor bolt 10 being guided through disk spring 51. Nut 20 in this case forms an axial support for disk spring 51, disk spring 51 being situated directly adjacent to nut 20 in the depicted exemplary embodiment. In principle, other elements, for example, washers, may also be situated between disk spring 51 and nut 20. In particular, disk spring 51 may be situated at the level of thread 11 on anchor bolt 10. In the depicted exemplary embodiment, disk spring 51 is implemented with a plurality of spring tongues 55 extending radially inwardly (FIG. 3).

Expansion anchor 1 also includes an indicator element 60 having an indicator ring 61, which in the delivery condition of the anchor (FIG. 1) is situated on disk spring 51 on the side of disk spring 51 facing nut 20. Once disk spring 51 is pretensioned to its setpoint tension, indicator ring 61 detaches from disk spring 51 (FIG. 2).

The sequence of FIGS. 1 through 3 schematically illustrates the setting operation of expansion anchor 1 within the scope of a setting method according to the present invention.

A bore hole 4 is initially provided in a substrate 3. Anchor bolt 10 of expansion anchor 1 is guided through an opening in component 7 to be secured. Anchor bolt 10 is then driven into bore hole 4, for example, by front face hammer blows. In the process, expansion sleeve 30 is also driven into bore hole 4, since a relative movement of expansion sleeve 30 toward thread 11 is prevented by stop 12. Nut 20, which forms a first support for spring element 50, advances increasingly closer to substrate 3 when driven in, until substrate 3 finally forms an opposing support for spring element 50 via component 7. This state is depicted in FIG. 1.

If, for example, an additional hammer blow is struck on the front face of anchor bolt 10 by hammer 9 schematically depicted in FIG. 2, spring element 50 is then compressed between nut 20 and substrate 3 due to the resulting deeper penetration of anchor bolt 10 into bore hole 4, i.e., energy from the hammer blow is stored in spring element 50. If, in the process, a setpoint tension in spring element 50 is reached, indicator ring 61 detaches from spring element 50, as shown in FIG. 2. The response of indicator element 60 is therefore evidence that the setpoint tension has been reached.

At the conclusion of the hammer below, spring element 50 may again relax, as is shown in FIG. 3. In this case, it moves nut 20 a certain extent away from substrate 3, and in so doing, draws anchor bolt 10 a certain extent out of bore hole 4. During this process, expansion sleeve 30, due to its interaction with the wall of bore hole 4, remains behind in bore hole 4, however. Consequently, an axial relative movement occurs between anchor bolt 10 and expansion sleeve 30, during which expansion section 13 is retracted into expansion sleeve 30. In this way, expansion sleeve 30 is expanded radially and expansion anchor 1 is fixed in substrate 3.

The energy for the radial expansion of expansion sleeve 30 originates from spring element 50. Therefore, the state of indicator element 60, which monitors spring element 50, allows for conclusions to be drawn about the completeness of the setting operation.

What is claimed is:

1. A method for setting an expansion anchor including an anchor bolt having an expansion section; an expansion sleeve surrounding the anchor bolt and expandable by retracting the expansion section; a spring element situated on the anchor bolt and tensionable by inserting the anchor bolt into a bore hole, the spring element capable of retracing the expansion section of the anchor bolt into the expansion sleeve when tension is subsequently released; and an indicator element indicating when a setpoint tension of the spring element is reached, the method comprising:
   providing the bore hole in a substrate;
   driving the expansion sleeve of the expansion anchor into the bore hole by applying axial forces to the anchor bolt;
   tensioning the spring element of the expansion anchor to the setpoint tension by applying axial forces to the anchor bolt, the indicator element indicating when the setpoint tension is reached; and
   retracting the expansion section of the anchor bolt into the expansion sleeve by energy stored in the spring element, so that the expansion sleeve expands radially and anchors the expansion anchor in the bore hole.

2. The method as recited in claim 1 wherein the indicator element is mechanically connected to the anchor bolt.

3. The method as recited in claim 1 wherein the indicator element is situated on the spring element.

4. The method as recited in claim 1 wherein the spring element includes at least one disk spring, and the indicator element includes an indicator ring connected to the disk spring and detaching at least partly from the disk spring when the setpoint tension is reached.

5. The method as recited in claim 4 wherein the disk spring and the indicator ring surround the anchor bolt.

6. The method as recited in claim 1 wherein the indicator element is activatable by deformation of the spring element or by impact of an element linked to the anchor bolt.

7. The method as recited in claim 1 wherein the anchor bolt includes an axial support for the spring element formed by a nut situated on the anchor bolt.

8. The method as recited in claim 1 further comprising a stop on the anchor bolt, the stop limiting a displacement of the expansion sleeve beyond the expansion section.

9. The method as recited in claim 1 wherein the spring element has a degressive spring characteristic.

\* \* \* \* \*